US008522424B2

(12) United States Patent
Hoshino et al.

(10) Patent No.: US 8,522,424 B2
(45) Date of Patent: Sep. 3, 2013

(54) WIRING CONNECTION APPARATUS

(75) Inventors: Yoshinori Hoshino, Kawasaki (JP); Naoya Yamazaki, Kawasaki (JP); Hiroshi Katagiri, Kawasaki (JP); Hideaki Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1080 days.

(21) Appl. No.: 12/003,937

(22) Filed: Jan. 3, 2008

(65) Prior Publication Data

US 2008/0163482 A1 Jul. 10, 2008

(30) Foreign Application Priority Data

Jan. 9, 2007 (JP) ................................ 2007-001019

(51) Int. Cl.
*B23P 19/00* (2006.01)
*H01R 43/00* (2006.01)

(52) U.S. Cl.
USPC .................................. 29/749; 29/758; 29/773

(58) Field of Classification Search
USPC ............ 29/749, 750, 758, 764, 773; 385/53, 385/134, 135; 211/26, 126.1
See application file for complete search history.

(56) References Cited

U.S. PATENT DOCUMENTS

| | | | | |
|---|---|---|---|---|
| 2,057,927 | A * | 10/1936 | Smith | 356/394 |
| 5,708,751 | A * | 1/1998 | Mattei | 385/135 |
| 5,732,945 | A * | 3/1998 | Sofia | 273/111 |
| 6,263,141 | B1 | 7/2001 | Smith | |
| 6,558,777 | B2 * | 5/2003 | Yoshii | 428/182 |
| 6,944,387 | B2 * | 9/2005 | Howell et al. | 385/135 |
| 7,460,758 | B2 * | 12/2008 | Xin | 385/135 |

FOREIGN PATENT DOCUMENTS

| | | |
|---|---|---|
| JP | 7-10199 | 2/1995 |
| JP | 7-294750 | 11/1995 |
| JP | 10-339817 | 12/1998 |
| JP | 2000-183552 | 6/2000 |
| JP | 2002-315630 | 10/2002 |
| JP | 2004-177734 | 6/2004 |

OTHER PUBLICATIONS

Office Action issued by the Japanese Patent Office on Jan. 15, 2013 in the corresponding Japanese patent application No. 2007-001019.

* cited by examiner

*Primary Examiner* — Thiem Phan
(74) *Attorney, Agent, or Firm* — Staas & Halsey LLP

(57) ABSTRACT

According to an aspect of an embodiment, a wiring connection apparatus comprises a tray including a plurality of wiring connection members for connecting a plurality of wiring and a tray holder body, which holds the tray, wherein the tray is rotatably provided in the tray holder body, and a wiring introduction opening for introducing the plurality of wiring into the tray is formed in proximity to an axis of rotation of the tray.

4 Claims, 15 Drawing Sheets

WIRING CONNECTION APPARATUS

CROSS REFERENCE TO RELATED APPLICATION

This application claims priority to Japanese Patent Application No. 2007-001019, filed on Jan. 9, 2007.

BACKGROUND

The present invention relates to a wiring connection apparatus, and particularly to a wiring connection apparatus for relay connecting wiring on a first side to wiring on a second side in electronic apparatus such as communications apparatus, information processing apparatus, and measuring apparatus.

DESCRIPTION OF THE RELATED ART

When connecting cables, a wiring connection apparatus including a plurality of adaptors, which allow free insertion and removal of cables, is used to simplify the change of connection relationships between the cables. This type of wiring connection apparatus is known as a patch panel, and is used to support network wiring operations.

FIG. 1 is a perspective view of a construction of a conventional patch panel.

As shown in FIG. 1, in a conventional patch panel 10, a frame 1 mounted on a metal rack, which is not shown in the drawings, holds a vertically standing plate-form panel 2.

A plurality of optical adaptors 3 are fitted to the panel 2. Specifically, a plurality of substantially rectangular optical adaptor fitting holes 4 are provided at predetermined intervals in the panel 2, and two optical adaptors 3 are fitted into each optical adaptor fitting hole 4 so as to be vertically aligned.

Fixing holes 6 for inserting fixing screws are formed in fixture parts 5 provided at left and right ends of the frame 1, and the frame 1 is fixed to the rack by screwing the fixing screws through the fixing holes 6 and into screw holes provided in the rack.

The optical cables are connected to the optical adaptors with the arrangement in this state. Specifically, trunk-line side optical cables 7 from a communication base station are connected to a fitting opening formed in the optical adaptor 3 on a front side of the patch panel 10 and the apparatus-side optical cables 8 are connected to a fitting opening formed in the optical adaptor 3 on the rear side of the patch panel 10.

In another arrangement, which is disclosed in U.S. Pat. No. 6,263,141, a plurality of trays are rotatably provided in a tray holder body, and each tray has a plurality of crescent-form internal wall parts. The cables are stored by winding around the internal wall parts so as to prevent excess cable from hanging loose and protruding from the tray.

However, in the conventional patch panel 10 shown in FIG. 1, it is difficult to fit the optical adaptors 3 at high density (in large numbers) for connecting the optical cables 7 and 8. This is because the optical adaptors 3 in the panel 2 are provided in a manner that allows sufficient space for the fingers of an operator to enter and connect the optical cables 7 and 8.

Were a large number of optical adaptors 3 to be fitted to the panel 2, the panel 2 would have to be enlarged, leading to an increase in the overall size of the patch panel 10.

To realize a thinner patch panel, an arrangement in which trays can be freely withdrawn from a body and optical adaptors are provided in the trays is conceivable. However, in this case cables with sufficient spare length to allow the trays to be withdrawn from the body must be stored in the trays, and the size of areas in the tray, which allow installation of the adaptors, is therefore reduced.

Moreover, since the conventional patch panel 10 shown in FIG. 1 is constructed with the optical adaptors 3 fitted in the plate-form panel 2, the patch panel 10 must be of a predetermined large size, making expansion difficult.

Moreover, in the conventional patch panel 10 shown in FIG. 1, the trunk-line side optical cables 7 from the communications base station and the apparatus-side optical cables 8 are connected via the optical adaptors 3, which are fitted in the vertically standing plate-form panel 2. This means that one set of cables (the apparatus-side optical cables 8 in the example shown in FIG. 1) are connected from the rear side of the panel 2.

Hence, in operations such as that of pulling cables connected from the rear side of the panel 2 (the optical cables 8 in the example shown in FIG. 1) to the front side of the panel 2, there is a risk of damage caused by unanticipated loads caused by the operator snagging the cables or the like.

Thus, to realize safe connection of the optical cables, a better way of routing and connecting the trunk-line side optical cables 7 from the communication base station and the apparatus-side optical cables 8, and a way of protecting the optical cables 7 and 8, are necessary.

SUMMARY

In view of the above described problems, it is the object of the present invention to provide a wiring connection apparatus, which allows dense installation (i.e. installation of a large number) of the optical adaptors for connecting the optical cables, a small apparatus size (i.e. a thin construction), and simple expansion, and realizes favorable optical cable routing and ease of use. Further, it is the object of the present invention to provide a wiring connection apparatus, which allows the optical cables to be routed safely without risk of damage.

According to an aspect of an embodiment, a wiring connection apparatus comprises a tray including a plurality of wiring connection members for connecting a plurality of wiring and a tray holder body, which holds the tray, wherein the tray is rotatably provided in the tray holder body, and a wiring introduction opening for introducing the plurality of wiring into the tray is formed in proximity to an axis of rotation of the tray.

DETAILED DESCRIPTION OF THE EMBODIMENTS

[Description of the Preferred Embodiments]

Figure 2:
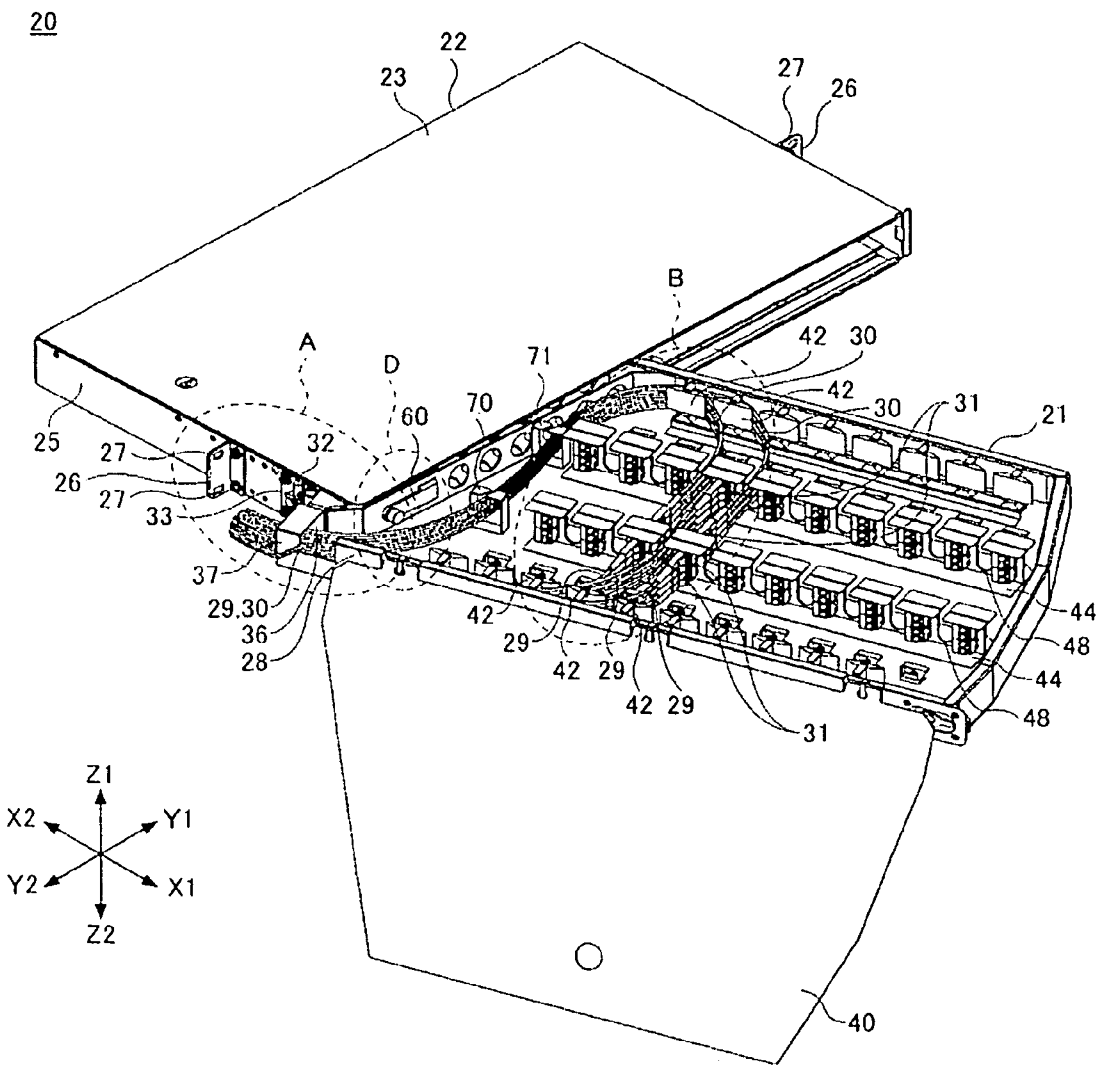
FIG. 2 is a perspective view of an overall construction of a patch panel 20 according to an embodiment of the present invention.

The following describes an embodiment of the present invention with reference to the drawings. FIG. 2 is a perspective view of an overall construction of a patch panel 20 according to the embodiment of the present invention.

FIG. 2 shows a state in which a tray 21 is rotated with respect to a tray holder body 22 and a transparent sheet 40 for covering the tray 21 is open.

As an example of the wiring connection apparatus of the present invention, the patch panel 20 has a depth direction (X1-X2 direction in FIG. 2) length of approximately 30.5 cm (12 inches), a width (Y1-Y2 direction length) of approximately 58.3 cm (23 inches), and a height of 1 U (4.445 cm). The height of a metal rack in which the patch panels are fixed is generally expressed in units of U. The patch panel 20 with the height of 1 U in the present example can therefore be used in any rack and allows simple expansion. It is to be noted, however, that the above described dimensions are no more than examples, and the present invention can be applied to patch panels with other dimensions.

The tray holder body 22 is, for instance, substantially rectangular in shape, is made of stainless steel, and includes a planar, substantially rectangular top panel 23 and bottom panel 24 (see FIG. 8).

A stainless steel, or the like, side panel 25 is provided extending from the bottom panel 24 (see FIG. 8) between a depth direction (X1-X2 direction in FIG. 2) peripheral section of the top panel 23 and a depth direction (X1-X2 direction in FIG. 2) peripheral section of the bottom panel 24.

Moreover, a stainless steel, or the like, far-side panel (not shown in the drawings), is provided on a far side (X2 side in FIG. 2), between a width direction (Y1-Y2 direction in FIG. 2) peripheral section of the top panel 23 and a width direction (Y1-Y2 direction in FIG. 2) peripheral section of the bottom panel 24.

On the other hand, on a near side (X1 side in FIG. 2), a width direction (Y1-Y2 direction in FIG. 2) peripheral section of the top panel 23 and a width direction (Y1-Y2 direction in FIG. 2) peripheral section of the bottom panel 24 sandwich an opening through which it is possible to rotate the tray 21 to a position outside the tray holder body 22. In other words, in the present example, the tray 21 rotates between the top panel 23 and the bottom panel 24 of the tray holder body 22 (see FIG. 8). The rotating construction of the tray 21 with respect to the tray holder body 22 is described in detail later with reference to FIG. 8.

Fixing brackets 26 are fixed to the side panel 25 of the tray holder body 22, fixing holes 27 for inserting fixing screws are provided in the fixing brackets 26, and the patch panel 20 is fixed to a rack, which is not shown in the drawings, by inserting the aforementioned fixing screws through the fixing holes 27 and into screw holes provided in the rack.

The tray 21 is, for instance, made of stainless steel and substantially rectangular in shape.

The transparent sheet 40 is provided, so as to freely rotate approximately 270 degrees, at a side surface part 28 located on what is the near side (X1 side in FIG. 2) when the tray 21 is in the tray holder body 22. The transparent sheet 40 covers the top of the tray 21. Details of the rotating construction of the transparent sheet 40 are described in detail later with reference to FIG. 13 and FIG. 14.

Optical adaptors 31 (wiring connection members), which connect communication base station trunk cable-side optical cables (wiring) 29 and apparatus-side optical cables (wiring) 30 and the like are densely installed (installed in large numbers) in the tray 21. A connection configuration of the optical cables 29 and 30 and the optical adaptors 31 is described in detail later with reference to FIG. 4 through FIG. 6.

The following makes reference to FIG. 3 as well as FIG. 2. FIG. 3 is a (first) diagram to illustrate a storage configuration of the optical cables 29 and 30 in the tray 21.

Figure 3A:
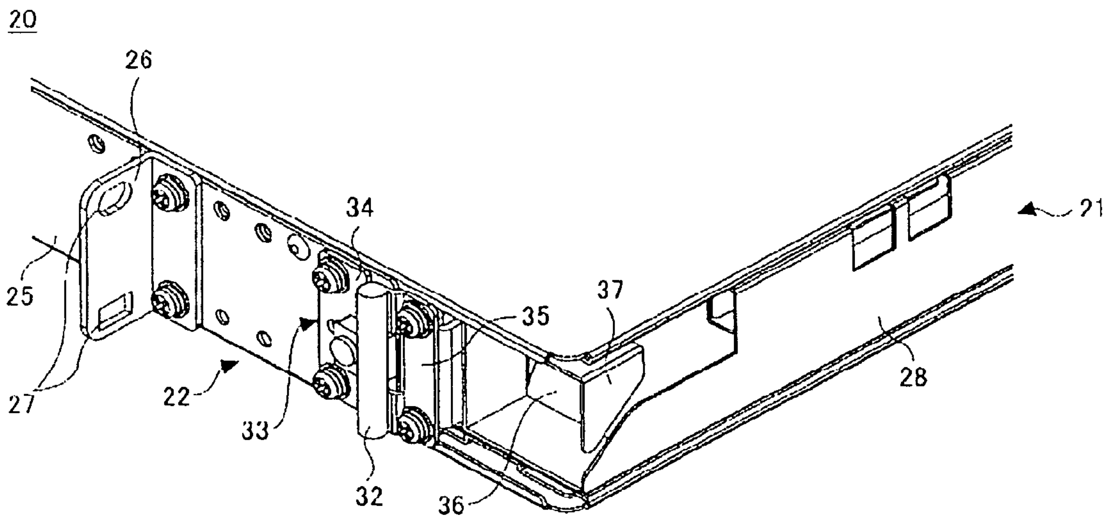
FIG. 3A is a (first) diagram to illustrate a storage configuration of optical cable in a tray.

Specifically, FIG. 3A is a partial enlargement of an area indicated by a dotted line A in FIG. 2 when the tray 21 is in the tray holder body 22. To simplify the drawing, optical cables 29 and 30 have been omitted.

Figure 3B:
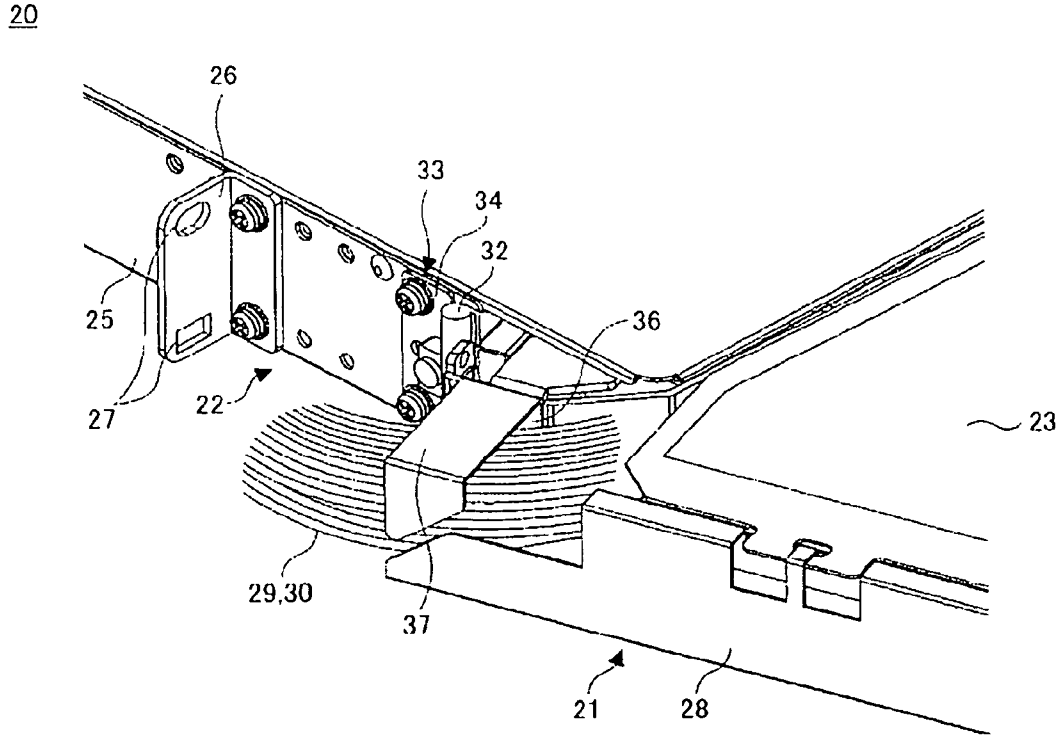
FIG. 3B is a (first) diagram to illustrate a storage configuration of optical cable in a tray.

FIG. 3B is a partial enlargement of an area indicated by a dotted line A in FIG. 2 when the tray 21 has been rotated out of the tray holder body 22, to a position outside the tray body 22. Note that in the example shown in FIG. 3B, the transparent sheet 40 covers the top of the tray 21. Also, for simplicity, FIG. 3B shows only a part of the optical cables 29 and 30.

As seen in FIG. 2 and FIG. 3, the tray 21 is rotatably connected to the side panel 25, which is provided between the top panel 23 and the bottom panel 24 (see FIG. 8) of the tray holder body 22, via a metal hinge (pivoting part) 33 that includes a pivot 32. The hinge 33 is, for instance, a pivot hinge substantially constructed from a single pivot 32 and two metal plates 34 and 35 (see FIG. 3A) rotatably connected to the pivot. One metal plate (first plate part) 34 is fixed to the tray holder body 22 using screws or the like, and the other metal plate (second plate part) is similarly fixed to the tray 21. According to this construction, the tray 21 rotates with the pivot 32 of the hinge 33 as an axis of rotation.

A cable introduction opening (wiring introduction opening) 36 for introducing the optical cables 29 and 30 connecting to the optical adaptors 31 is formed in the tray 21 in proximity to the pivot 32 of the hinge 33. Specifically, the cable introduction opening 36 is formed by a metal cable coordinating member 37 having an open-sided square profile and an end of the side part 28 of the tray 21. The opening of the cable introduction opening 36 is formed in substantially the same plane as the metal plate 35 that is fixed to the tray 21.

The communication base station trunk cable-side optical cables 29 and the apparatus-side optical cables 30 to be connected to the optical adaptors 31 are gathered and passed as in a bunch into the tray 21 from an external part via the cable introduction opening 36.

As described above, the opening of the cable introduction opening 36 is formed in proximity to the pivot 32 of the hinge 33 and in substantially the same plane as the metal plate 35 that is fixed to the tray 21, and the metal plate 35 fixed to the tray 21 rotates around the pivot 32. Hence, when the tray 21 rotates around the pivot 32, the opening of the cable introduction opening 36 rotates accordingly. In other words, the tray 21 rotates with an axis of rotation that is near the opening of the cable introduction opening 36. Consequently, even when the optical cables 29 and 30 are connected to the optical adaptor provided in the tray 21, the tray 21 can be rotated without changing lengths (cable length) of the optical cables 29 and 30.

Thus, in the present example, it is possible to store the optical cables 29 and 30 in the tray 21 without changing the lengths of the optical cables 29 and 30, i.e. without needing to provide spare length in the optical cables 29 and 30. The installation region for the optical adaptors 31 in the tray 21 can therefore be increased in size. Hence, it is possible to densely install (install in large numbers) optical adaptors 31 and optical cables 29 and 30 connecting to the optical adaptors 31 inside the tray 21.

Moreover, since it is possible to store the optical cables 29 and 30 inside of the tray 21 without needing to provide spare length in the optical cables 29 and 30, undesired loads on the optical cables 29 and 30 at rotation of the tray 21 can be avoided. Consequently, it is possible to perform connection operations on the optical cables 29 and 30 safely and without damaging the optical cables 29 and 30.

As described above, the patch panel 20 of the present example is a thin-type apparatus with a height of 1 U (4.445 cm). Inside the thin-type apparatus, high-density installation of the optical adaptors 31 and the optical cables 29 and 30 in the tray 21, favorable cable routing, and favorable operability are realized.

Figure 4:
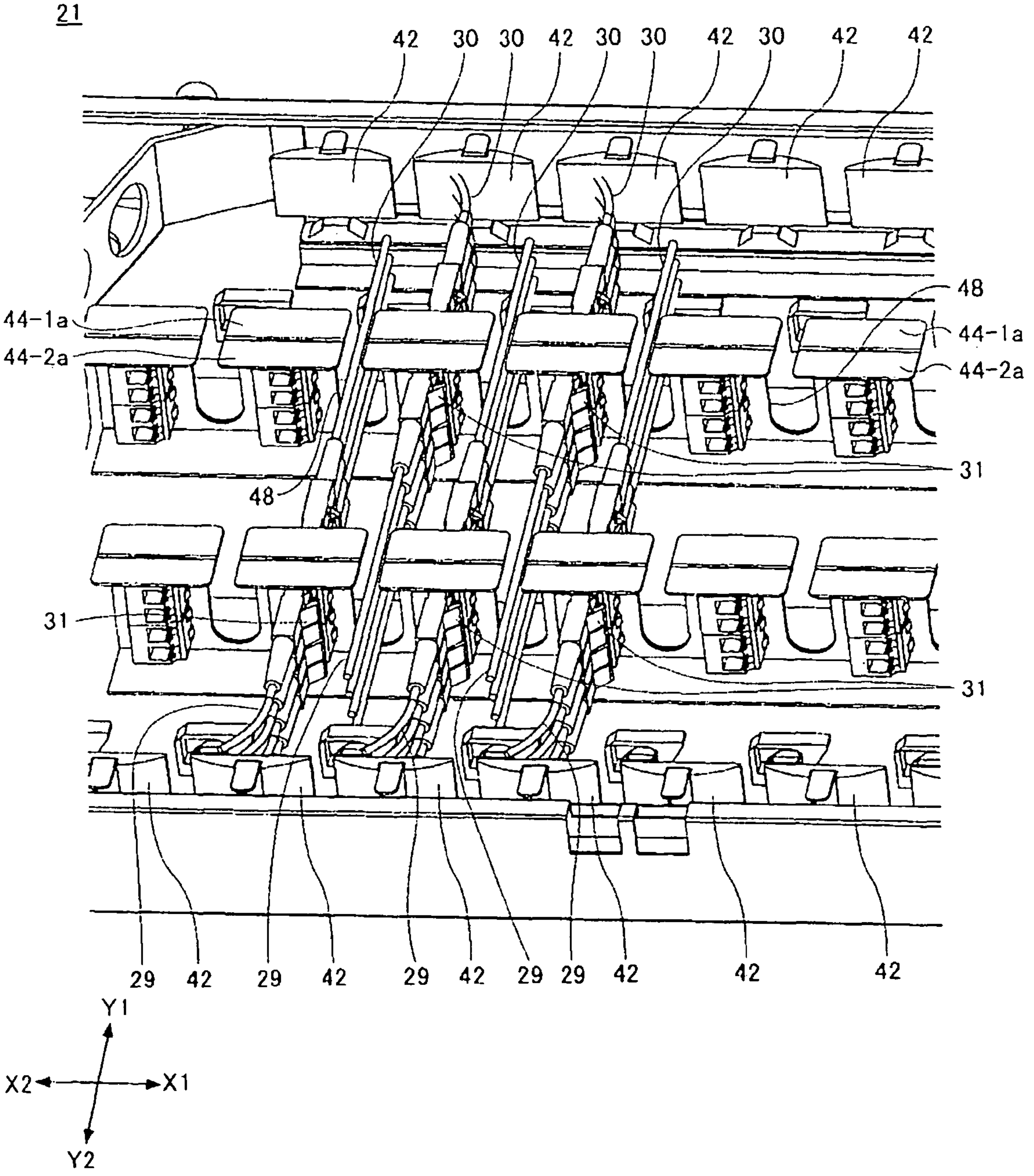
FIG. 4 is a (second) diagram to illustrate a storage configuration of optical cable in a tray.
Figure 5:
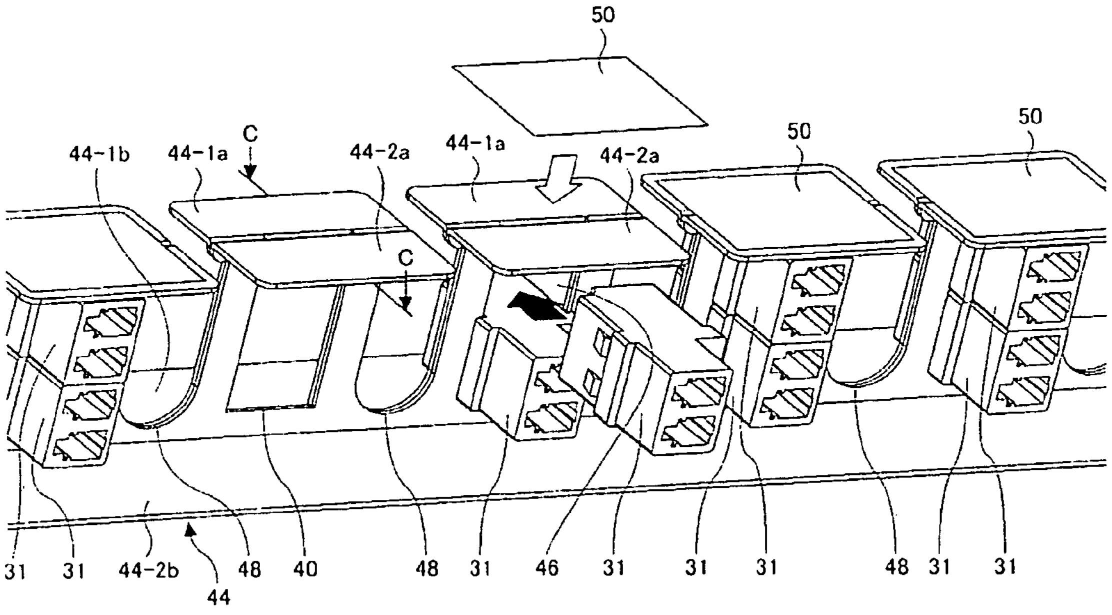
FIG. 5 is shows a layout of optical adaptors.
Figure 6:
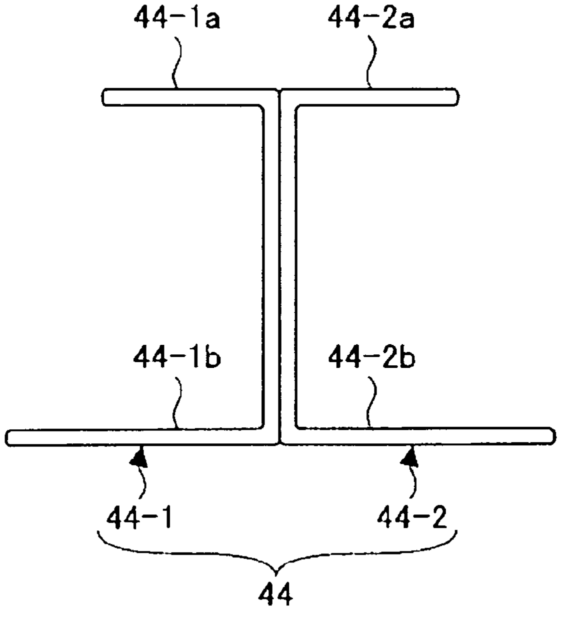
FIG. 6 is a cross-sectional view through C-C in FIG. 5.

The following is a detailed description of a connection configuration between the optical cables 29 and 30 and the optical adaptors 31, with reference to FIG. 4 through FIG. 6.

FIG. 4 is a (second) diagram to illustrate a storage configuration of the optical cable 29 and 30 in the tray 21. FIG. 4 shows a partial enlargement of an area indicated by a dotted line B in FIG. 2. To simplify FIG. 4, only parts of the optical cables 29 and 30 are shown and the transparent sheet has been omitted.

As seen in FIG. 2 and FIG. 4, the communication base station trunk cable-side optical cables 29 and the apparatus-side optical cables 30, which have been gathered together and passed into the tray 21 from outside the patch panel 20 via the cable introduction opening 36, follow a predetermined route in the tray 21 and then connect to the optical adaptors 31, which are installed in the tray 21.

Specifically, the communication base station trunk cable-side optical cables 29 make an anticlockwise turn on entry to the tray 21 from the cable introduction opening 36 before connecting to the optical adaptors 31. The apparatus-side optical cables 30 make clockwise turn on entry to the tray 21 from the cable introduction opening 36 and pass through the metal cable coordinating members 70 and 71 with the open-sided square profile (see FIG. 2) before connecting to the optical adaptors 31.

Note however, that from the point of view of mechanical cable damage (deterioration) and optical damage, it is necessary to ensure that an angle of curvature for the optical cables 29 and 30 in the tray 21 does not exceed a predetermined angle. The method of introduction of the optical cables 29 and 30 into the tray 21 from the cable introduction opening 36 is therefore determined according to the angle of curvature of the optical cables 29 and 30 and the positioning of the optical adaptors 31 to which the optical cables 29 and 30 are to be connected.

Additionally, to ensure that the angle of curvature of the optical cables 29 and 30 in the tray 21 does not exceed the predetermined value, a plurality of cable curvature radius controlling members 42 are provided along an internal wall of the tray 21 (X1-X2 direction). As shown in FIG. 2, the optical cables 29 and 30 introduced into the tray 21 from the cable introduction opening 36 are passed between the internal wall of the tray 21 and the cable curvature radius controlling members 42, bent into a curve shape of a predetermined diameter, and connected to the optical adaptors 31.

The following describes a layout configuration of the optical adaptors 31, with reference to FIG. 4, FIG. 5 and FIG. 6. FIG. 5 shows a layout configuration of the optical adaptors 31 and FIG. 4 is a partial enlargement. FIG. 6 is a cross-sectional view through C-C in FIG. 5.

As shown in FIG. 4, the plurality of adaptors 31 is provided in two rows in the depth direction (Y1-Y2 direction) of the tray 21.

Specifically, as shown in FIG. 6, the optical adaptors 31 are fitted into an optical adaptor fitting members (wiring connection member fitting member) 44 constructed by disposing (in a back-to-back arrangement) two bent panel members (bent members) 44-1 and 44-2 so as to be symmetrical about the surface at which the two connect. The bent panel members 44-1 and 44-2 are formed from thin plate bent to have an open-sided square profile in vertical cross-section, and provided extending in a width direction (X1-X2 direction) of the tray 21.

As shown in FIG. 5, a plurality of substantially rectangular optical adaptor fitting holes 46 are provided with a predetermined interval therebetween in a vertically extending surface of the optical adaptor fitting member 44. Two optical adaptors are fitted in each optical adaptor fitting hole 46 so as to be in vertical alignment.

Further, a substantially U-shaped optical cable communication slit (wiring arrangement slit) 48 is formed between adjacent optical adaptor fitting holes 46.

As shown in FIG. 4, the optical adaptor fitting members 44 of this construction are provided as two rows in the depth direction (Y1-Y2 direction) of the tray 21. The optical adaptor fitting members 44 are formed so that the optical adaptor fitting holes 46 formed in one adaptor fitting member 44 alternate, when viewed in the depth direction of the tray 21 (Y1-Y2 direction), with the adaptor fitting holes 46 formed in the other adaptor fitting member 44. This arrangement is used to allow the optical cables 29 or 30, which connect to the optical adaptors 31 fitted in one adaptor fitting member 44, to pass through the optical cable communication slits 48 formed in the other adaptor fitting member 44.

Figure 1:
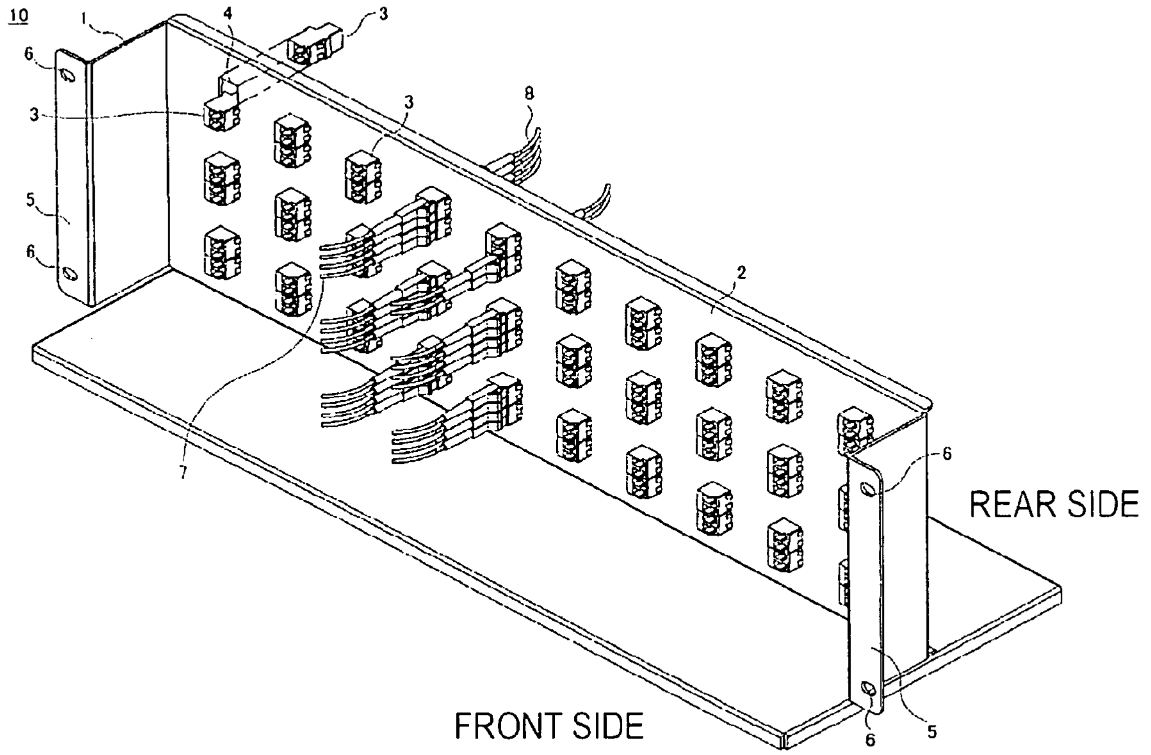
FIG. 1 is a perspective view of the construction of a conventional patch panel.

This construction allows the separation of adjacent optical adaptor fitting holes 46 to be increased in comparison to the example shown in FIG. 1, making it possible to secure space for operations to connect the optical cables 29 and 30. As a result, ease of use can be improved and the optical adaptors can be installed at high density (in large numbers) in the tray 21.

It is to be noted that although the optical cable communication slits 48 formed between the adjacent optical adaptor fitting holes 46 are substantially U-shaped, portions of peripheral sections of top plate parts 44-1*a* and 44-2*a*, which form part of the bent panel members 44-1 and 44-2 bent to have a substantially open-sided square profile in vertical cross-section, cover upper portions of the substantially U-shaped optical cable communication slit 48, as shown in FIG. 5.

Thus, due to the portions of peripheral sections of top plate parts 44-1*a* and 44-2*a* of the bent panel members 44-1 and 44-2, the optical cable communication slits 48 are narrower in the upper portion than in a lower portion. Since the portions of the peripheral sections of the top plate parts 44-1*a* and 44-2*a* of the bent panel members 44-1 and 44-2 will catch even the uppermost of the optical cables 29 and 30 passing through the optical cable communication slit 48, the above construction can prevent the optical cables 29 and 30 from coming out of the optical cable communication slits 48.

The top plate part 44-1*a* of the bent panel member 44-1 and the top plate part 44-2*a* of the bent panel member 44-2 are coplanar, and a writable label 50 can be stuck thereon. By displaying connection targets for the optical cables 29 and 30, for instance, it is possible to clarify the optical cable 29 and 30 connection operations, which have become more complicated due to the high-density installation of optical adaptors 31 and optical cables 29 and 30 in the tray 21.

Additionally, in the conventional patch panel 10 shown in FIG. 1, a predetermined interval is provided between the vertically adjacent optical adaptor fitting holes 4 to ensure that the plate-form panel 2 in which the optical adaptor fitting holes 4 are formed has sufficient strength. In the present example, on the other hand, the strip-form top plate parts 44-1*a* and 44-2*a* and bottom plate parts 44-1*b* and 44-2*b* are provided above and below the vertical surface in which the optical adaptor fitting holes 46 are formed. This arrangement ensures that the optical adaptor fitting member 44 has sufficient strength and allows a height of the optical adaptor fitting member 44 to be limited.

The following describes a manner of insertion and removal of the optical adaptors 31 into and from the optical adaptor fitting holes 46 with reference to FIG. 7. FIG. 7 is a diagram to illustrate the manner in which the optical adaptors 31 are inserted into and removed from the optical adaptor fitting holes 46, and is a partial enlargement showing the area indicated by a dotted line D in FIG. 2. For simplicity, the optical cables 29 and 30 have been omitted from FIG. 7.

Figure 7A:
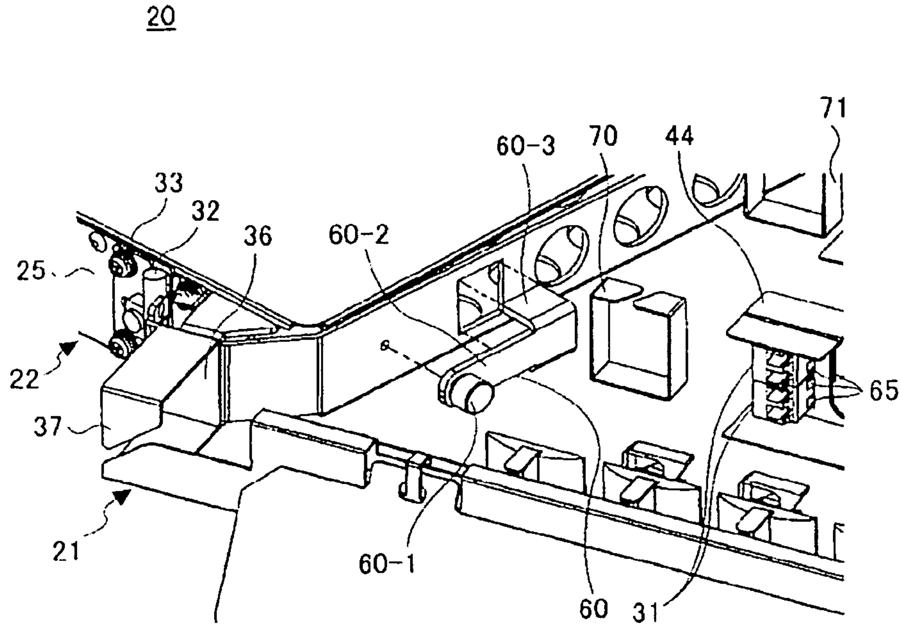
FIG. 7A is a diagram to illustrate a manner in which the optical adaptor is inserted into and removed from an optical adaptor fitting hole.
Figure 7B:
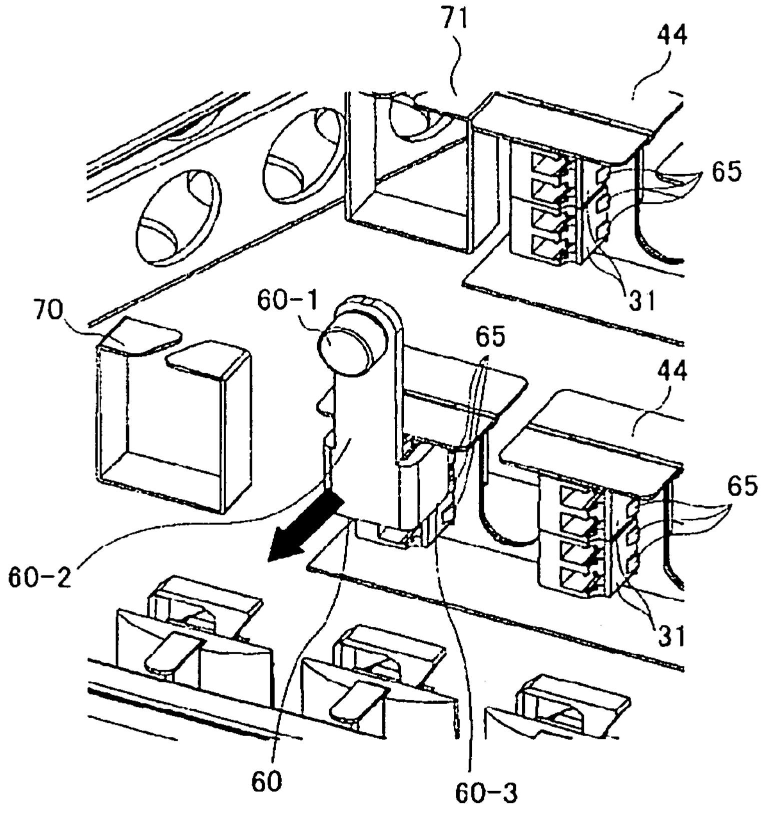
FIG. 7B is a diagram to illustrate a manner in which the optical adaptor is inserted into and removed from an optical adaptor fitting hole.

As seen in FIG. 7A, the optical adaptors 31 are inserted into and removed from the optical adaptor fitting holes 46 using an optical adaptor insertion and removal member (wiring connection member insertion and removal member) 60 provided on an inner side surface of the tray 21. The optical adaptor insertion and removal member 60 is a metal tool substantially constructed from a support part 60-2 in which a screw 60-1 has been fitted, and a holding part 60-3, which has a substantially open-sided square profile when viewed in cross-section, so as to correspond in shape to the outer form of the optical adaptor 31.

A substantially rectangular optical adaptor insertion and removal member fitting hole 61, which corresponds in shape to the holding part 60-3, is provided in the inner side surface of the tray 21. The holding part 60-3 of the optical adaptor insertion and removal member 60 is normally fitted in the optical adaptor insertion and removal member fitting hole 61. The optical adaptor insertion and removal member 60 is further fixed to the inner wall of the tray 21 using the screw 60-1.

When the optical adaptors 31 are to be removed from the optical adaptor fitting holes 46 for cleaning or maintenance, the screw 60-1 is loosened from the inner side surface of the tray 21 and the holding part 60-3 is pulled out from the optical adaptor insertion and removal member fitting hole 61. When the optical adaptor 31 is to be removed from the optical adaptor fitting hole 46 (see FIG. 5) a catch 65 provided on a side surface of the adaptor 31 is pressed using an inner surface of the holding part 60-3 of the optical adaptor insertion and removal member 60 and the optical adaptor insertion and removal member 60 is moved in a direction shown by the arrow in FIG. 7B. When the optical adaptor 31 is to be inserted into the optical adaptor fitting hole 46 (see FIG. 5), the optical adaptor insertion and removal member 60 is moved in a direction opposite to that shown by the arrow in FIG. 7B.

Thus, by providing the optical adaptor insertion and removal member 60 having a simple construction in the tray 21 and then making use of the optical adaptor insertion and removal member 60, the densely arranged (large number of) optical adaptors 31 can be inserted into and removed from the optical adaptor fitting holes 46 in a simple manner for cleaning, maintenance, and the like.

Next, the rotatable construction of the tray 21 with respect to the tray holder body 22 is described in detail below with reference to FIG. 8 through FIG. 11.

Figure 8A:
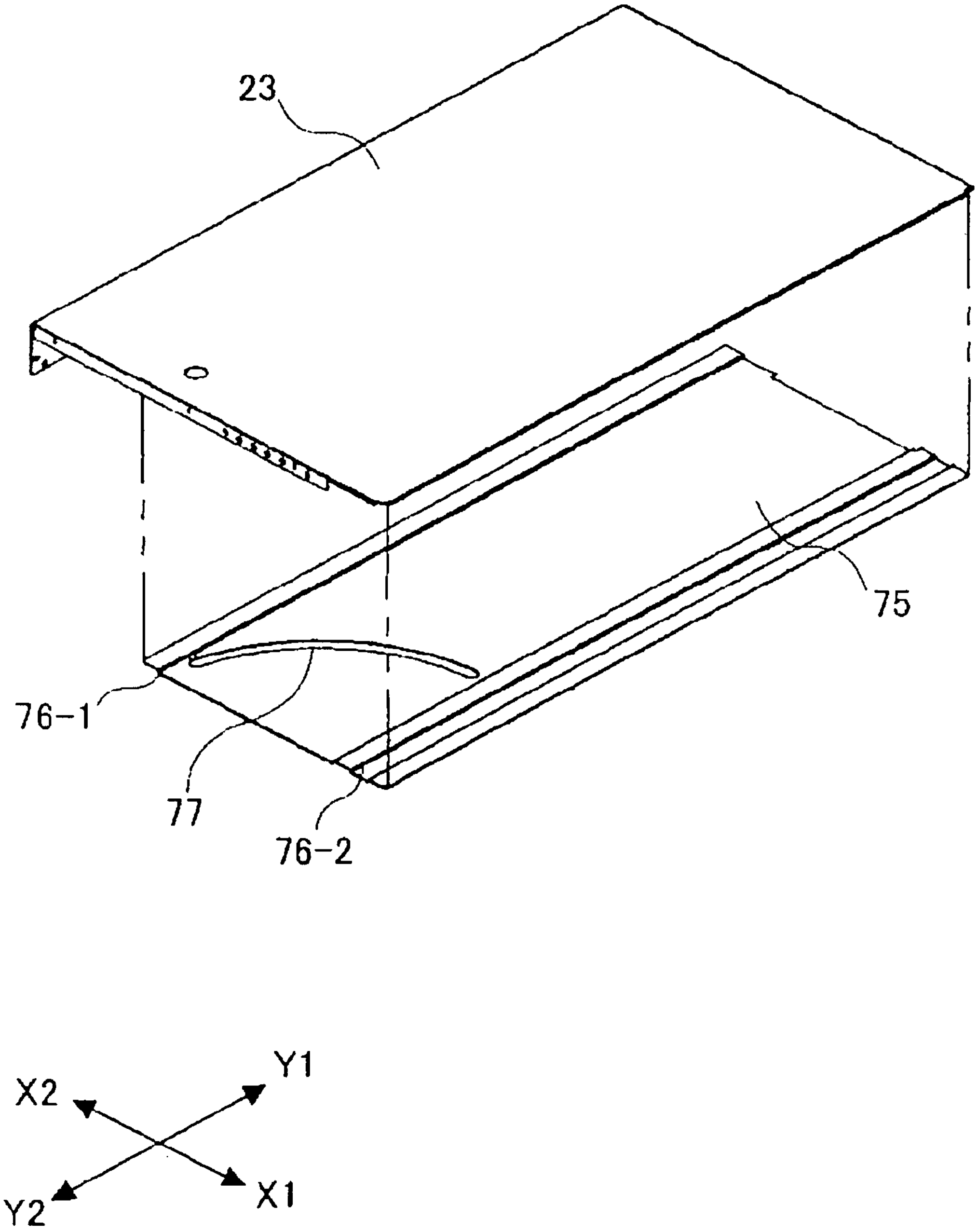
FIG. 8A is an exploded perspective view showing a schematic construction of a tray holder body.
Figure 8B:
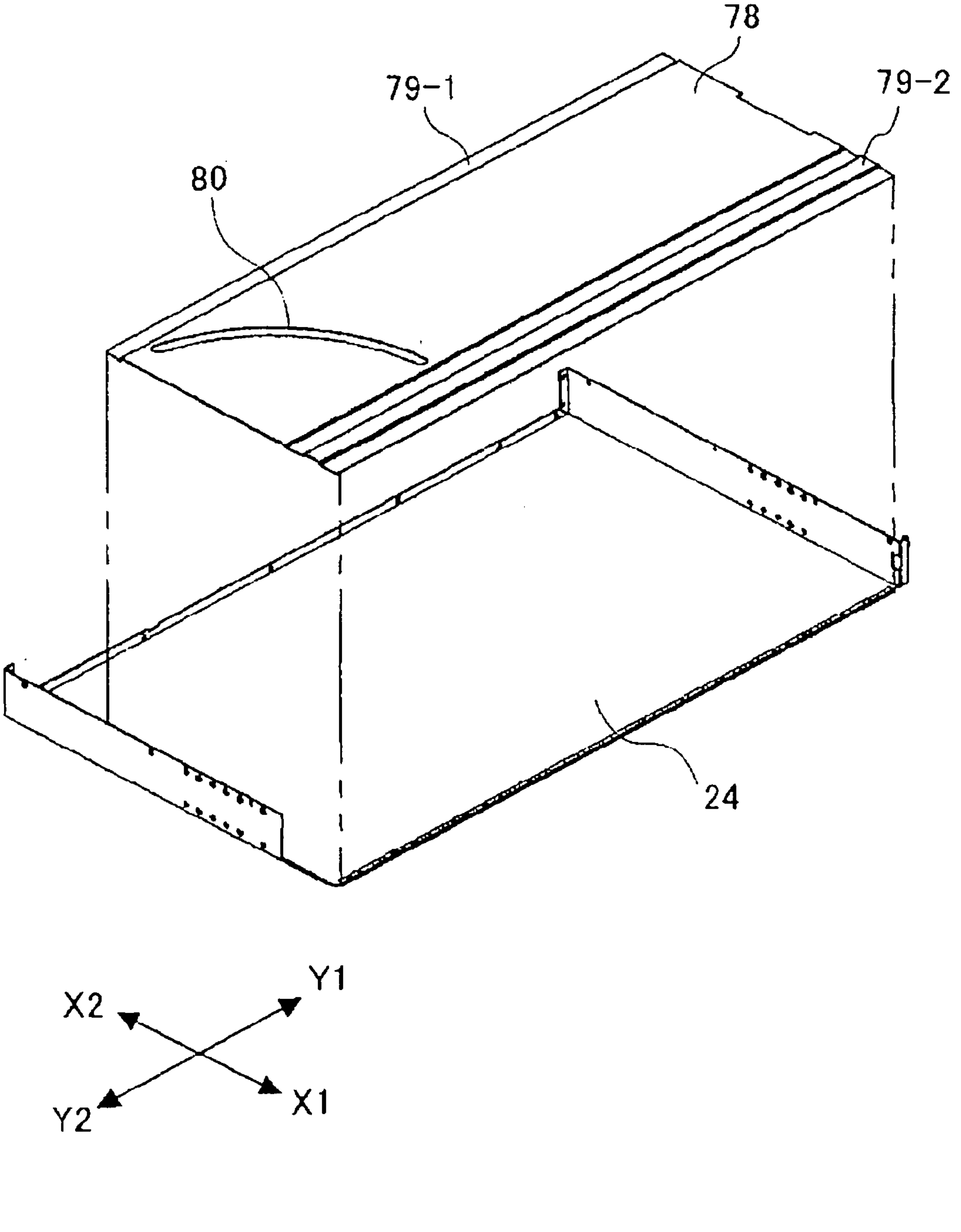
FIG. 8B is an exploded perspective view showing a schematic construction of a tray holder body.

FIG. 8 is an exploded perspective view showing a schematic construction of the tray holder body 22. FIG. 8A is an exploded perspective view of the top panel 23 side of the tray holder body 22, and FIG. 8B is an exploded perspective view of the bottom panel 24 side of the tray holder body 22.

As shown in FIG. 8A, a reinforcing plate 75, which is a metal plate part, is provided on an internal underside of the top panel 23 of the tray holder body 22. Corrugated parts 76-1 and 76-2, with an uneven profile when seen in cross-section, are formed in the width direction (Y1-Y2 direction) peripheral sections of the reinforcing plate 75. The corrugated parts 76-1 and 76-2 function as stiffeners, and the reinforcing plate 75 mechanically reinforces the top panel 23 of the tray holder body 22.

A slit (rotation-use slit) 77 is pierced through the reinforcing plate 75, forming an approximately quarter-circular arc centered on the pivot 32 of the hinge 33, which is the axis of rotation of the tray 21 with respect to the tray holder body 22. The radius of the quarter-circular arc may be set to approximately 3 inches (7.6 cm), and the width of the slit 77 to approximately 1 cm.

As shown in FIG. 8B, a reinforcing plate 78, which is a metal plate part, is provided on an internal upper side of the bottom panel 24 of the tray holder body 22. Corrugated parts 79-1 and 79-2, with an uneven profile when seen in cross-section, are formed in the width direction (Y1-Y2 direction) peripheral sections of the reinforcing plate 78. The corrugated parts 79-1 and 79-2 function as stiffeners, and the reinforcing plate 78 mechanically reinforces the bottom panel 24 of the tray holder body 22.

A slit 80 is pierced through the reinforcing plate 78, forming an approximately quarter-circular arc centered on the pivot 32 of the hinge 33, which is the axis of rotation of the tray 21 with respect to the tray holder body 22. The radius of the quarter circular arc may be set to approximately 3 inches (7.6 cm), and the width of the slit 80 to approximately 1 cm.

Figure 9:
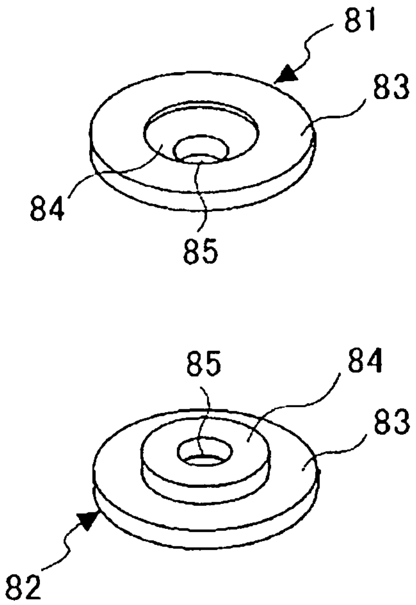
FIG. 9 is a perspective view showing an external form of a bushing provided in a slit of a reinforcing plate in a top panel of the tray holder body and a bushing provided in a slit of a reinforcing plate in a bottom panel of the tray holder.

Bushings 81 and 82, shown in FIG. 9, are provided in the above-described slits 77 and 80. FIG. 9 is a perspective view showing an external form of the bushing 81 provided in the slit 77 of the reinforcing plate 75 of the top panel 23 of the tray holder body 22 and the bushing 82 provided in the slit 80 of the reinforcing plate 78 of the bottom panel 24 of the tray holder body 22.

As shown in FIG. 9, the resin bushings 81 and 82 have the same shape and include a bottom part 83 and, on the bottom part 83, a protruding part 84 with a smaller diameter than the bottom part 83. A fixing member-use hole 85 is formed in an internal portion of the protruding part 84 to allow insertion of a fixing member such as a rivet or a screw. A diameter of the protruding part 84 is set to be slightly smaller than the width of the above-described slits 77 and 80.

The protruding part 84 of the bushing 81 is inserted into the slit 77 from the top panel 23 side, i.e. from above. The protruding part 84 is fixed to a tray 21 protruding part (not shown in the drawings) that corresponds in position to the protruding part 84 using a fixing member such as a rivet or screw provided in the fixing member-use hole 85 of the protruding part 84, thereby fixing the bushing 81 to the tray 21.

In the same way, the protruding part 84 of the bushing 82 is inserted into the slit 80 from the bottom panel 24 side, i.e. from the bottom. The protruding part 84 is fixed to a tray 21 protruding part (not shown in the drawings) that corresponds in position to the protruding part 84 using a fixing member such as a rivet or screw provided in the fixing member-use hole 85 of the protruding part 84, thereby fixing the bushing 82 to the tray 21.

Figure 10:
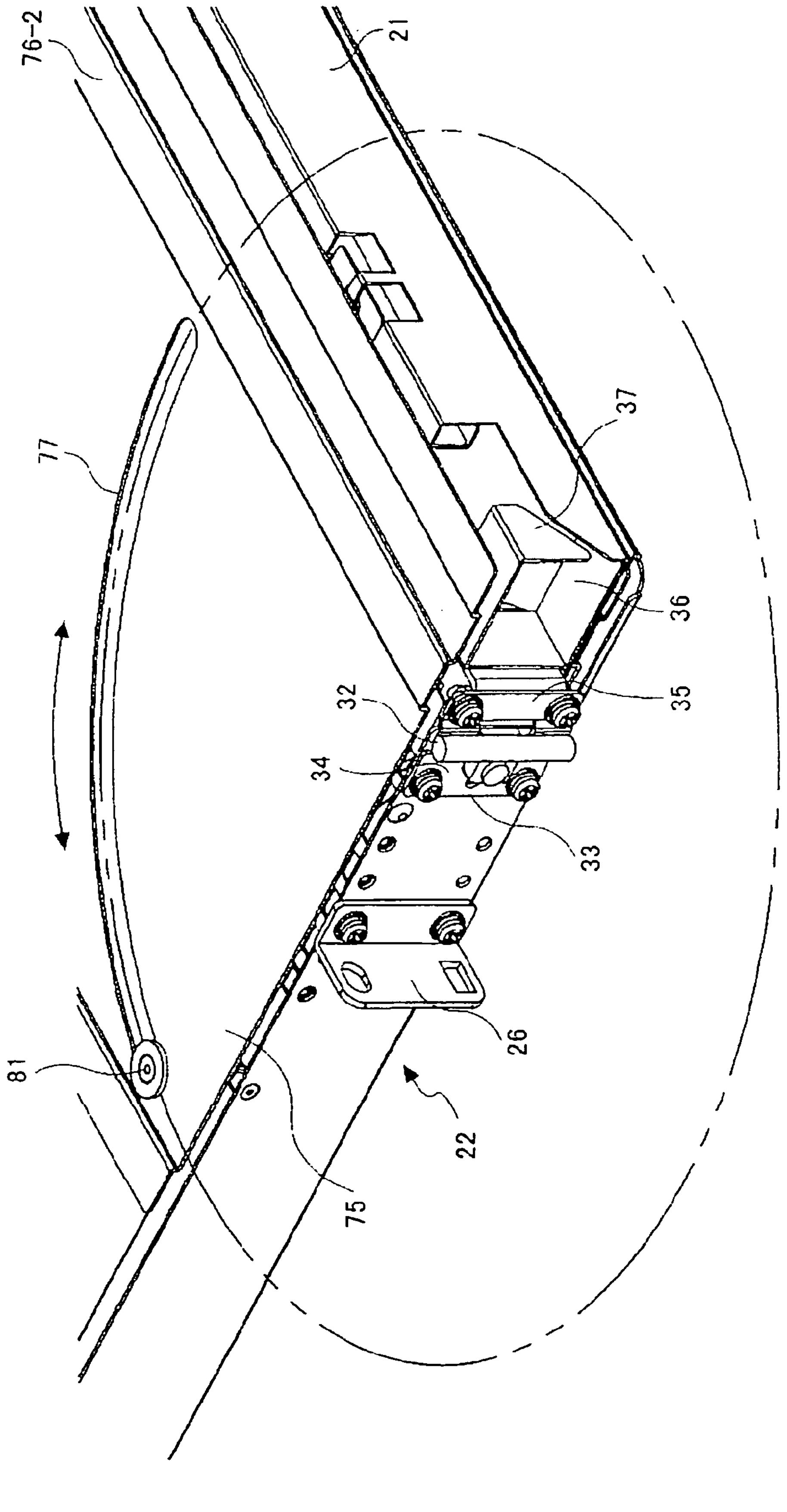
FIG. 10 is a partial enlarged perspective view showing a state of the bushing provided in the reinforcing slit in the top panel of the tray holder body.

FIG. 10 shows a state in which the bushing 81 is provided in the slit 77 of the reinforcing plate 75 of the top panel 23 of the tray holder body 22. Note that the top panel 23 and the optical cables 29 and 30 have been omitted from FIG. 10.

Since, as seen in FIG. 10, the bushing 81 is fixed to the tray 21 via the slit 77 of the reinforcing plate 75 of the top panel 23 of the tray holder body 22 and the diameter of the protruding part 84 is set to be slightly smaller than the width of the slit 77, the bushing 81 can move in the slit 77 together with the tray 21 in a direction shown by the arrow in FIG. 10. The same explanation may further be applied to the bushing 82 of the bottom panel side.

With the tray 21 held at the top and bottom in this way by bushing 81 provided in the slit 77 of the reinforcing plate 75 of the top panel 23 of the tray holder body 22 and the bushing 82 provided in the slit 80 of the reinforcing plate 78 of the bottom panel 24, the tray 21 is prevented from sagging due to its own weight, even when fully withdrawn by rotation from the tray holder body 22. In other words, the bushings 81 and 82 function as strengthening members, which support the weight of the tray 21 during rotation operations on the tray 21.

Moreover, the movement of the bushings 81 and 82 in the slits 77 and 80 allow smooth rotation operations of the tray 21 with respect to the tray holder body 22. Further, the bushings 81 and 82 prevent rotation of the tray 21 with respect to the tray holder body 22 when the bushings 81 and 82 make contact with ends of the slits 77 and 80. It is thereby ensured that the tray 21 does not rotate beyond this point.

Figure 11A:
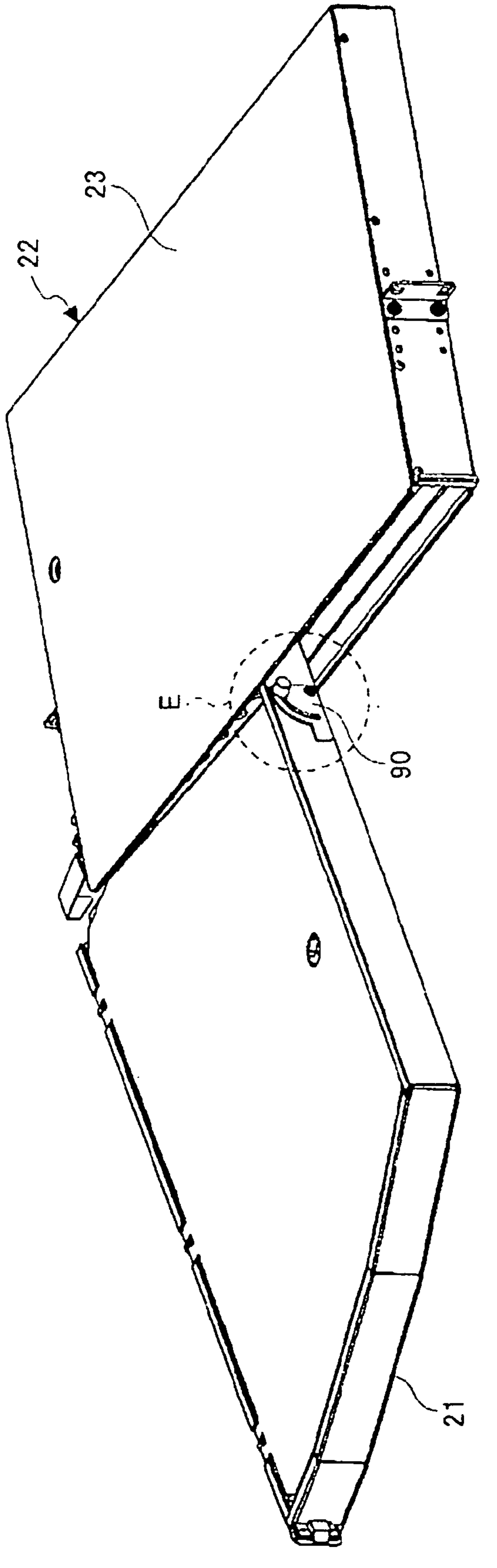
FIG. 11A is a diagram to illustrate a construction to stop rotation of the tray when the tray has been withdrawn by rotation from the tray holder body.
Figure 11B:
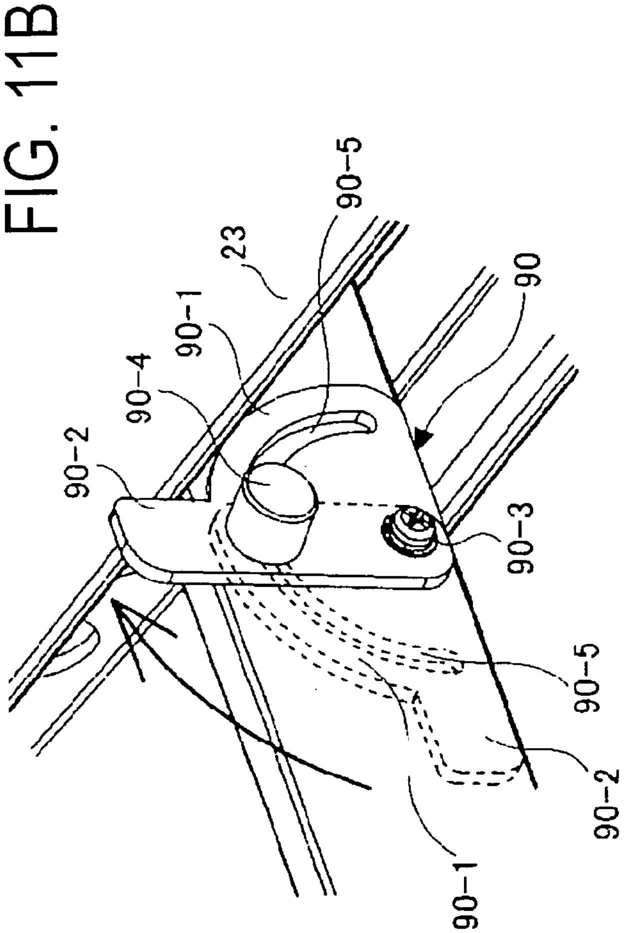
FIG. 11B is a diagram to illustrate a construction to stop rotation of the tray when the tray has been withdrawn by rotation from the tray holder body.

The following describes a construction to stop rotation of the tray 21 when the tray 21 has been withdrawn by rotation from the tray holder body 22, with reference to FIG. 11. FIG. 11 is a diagram to illustrate a construction to stop rotation of the tray 21 when the tray 21 has been withdrawn by rotation from the tray holder body 22. FIG. 11B is an enlargement of an area indicated by a dotted line E in FIG. 11A.

As seen in FIG. 11, a plate-form tray rotation stopper 90 made of stainless steel or the like is provided on a tray 21 side surface, which is located at the far side of the tray holder body 22 when the tray 21 is stored in the tray holder body 22.

As shown in FIG. 11B, the tray rotation stopper 90 is substantially constructed from a main part 90-1 having a substantially quarter-circular form, and a top panel contacting part 90-2 extending from the main part 90-1.

A pivot 90-3 constructed from a screw or the like is provided at a corner part of the main part 90-1, and the top panel contacting part 90-2 and a screw part 90-4 are provided on the main part 90-1 at a predetermined distance away from the pivot 90-3. Moreover, a slit (tray rotation stopper slit) 90-5 pierces the main part 90-1, forming an quarter-circular arc centered on the pivot 90-3 and with a radius corresponding to a length between the pivot 90-3 and the screw part 90-4. The screw part 90-4 is located in the slit 90-5.

According to this construction, and as shown in FIG. 11A, the tray rotation stopper 90 may be fixed to the side surface of the tray 21 using the screw part 90-4 so that the top panel contacting part 90-2 is positioned at a lower portion of the tray 21 side surface on which the tray rotation stopper 90 is provided (in FIG. 11B this state is shown using a dotted line).

Slightly loosening the screw part 90-4 allows the tray rotation stopper 90 to be rotated (slid) through 90 degrees around the pivot 90-3 as shown by an arrow in FIG. 11B. On rotating 90 degrees, the top panel contacting part 90-2 of the tray rotation stopper 90 makes contact with an edge part of the top panel 23 of the tray holder body 22. By tightening the screw part 90-4 with the arrangement in this state, the contact state between the top panel contacting part 90-2 of the tray rotation stopper 90 and the edge part of the top panel 23 of the tray holder body 22 is fixed and maintained.

With this construction, it is possible to avoid having the tray 21 mistakenly reenter the tray holder body 22 after withdrawal by rotation from the tray holder body 22 to performs operations such as removal or insertion of the optical cables 29 and 30. In other words, the top panel contacting part 90-2 of the tray rotation stopper 90 functions as a rotation operation stopper by contacting the edge part of the top panel 23 of the tray holder body 22, making it possible to avoid having the tray 21 mistakenly enter the tray holder body 22 and to fix and maintain the contacting state by tightening the screw part 90-4. Hence, safe insertion and removal operations on the optical cables 29 and 30 can be guaranteed.

As described above, the present example has a construction in which the tray rotation stopper 90 is capable of rotation around the pivot 90-3. Note that a tray rotation stopper having a construction in which the top panel contacting part 90-2 slides vertically (up and down direction) is conceivable. However, in such a construction, the maximum length of the vertical (up and down direction) sliding is limited by the vertical length of the side surface of the tray 21 and is therefore short. In construction of the present example, on the other hand, when the tray rotation stopper 90 is positioned at a lower portion of the tray 21 side surface where the tray rotation stopper 90 is provided, the only limit on the length of the top panel contacting part 90-2 is that the 90-2 must remain within an area corresponding to the tray 21 side surface.

Moreover, if the tray rotation stopper has the construction in which the top panel contacting part 90-2 is caused to slide vertically (up and down direction), an operator is required to support the top panel contacting part 90-2 with one hand while operating the screw part 90-4 with the other. With the present example, on the other hand, the tray rotation stopper 90 can be rotated around the pivot 90-3, and it is therefore conveniently possible to perform the rotation so that the top panel contacting part 90-2 of the tray rotation stopper 90 contacts the edge part of the top panel 23 of the tray holder body 22 and to fix and maintain this state using just one hand.

As described with reference to FIG. 2, the transparent sheet 40 is provided in a way that allows approximately 270 degrees of rotation on a side surface part 28, which is positioned at the near side (X1 side in FIG. 2) when the tray 21 is in the tray holder body 22. The following describes the transparent sheet 40 with reference to FIG. 12.

Figure 12:
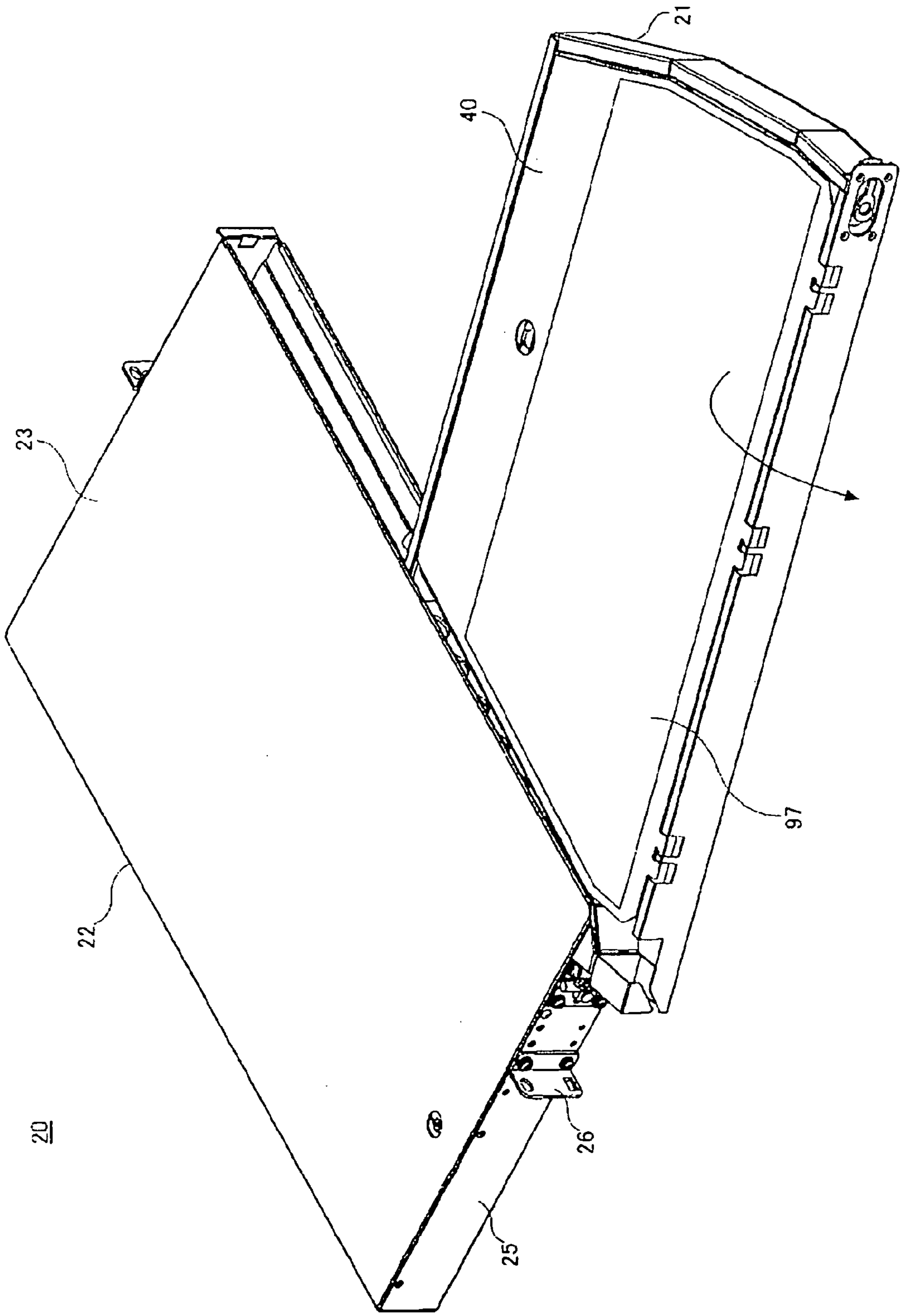
FIG. 12 is a perspective view showing a transparent sheet provided on the tray.

FIG. 12 is used to illustrate the transparent sheet 40 provided in the tray 21, and is a perspective view showing the state in which the tray 21 has been withdrawn by rotation from the tray holder body 22. Note that the internal construction of the tray 21 and the optical cables 29 and 30 have been omitted from FIG. 12. While FIG. 2 shows a state in which the tray 21 is rotated with respect to a tray holder body 22 and the transparent sheet 40 is open, FIG. 12 shows the transparent sheet 40 covering the entire upper part of the tray 12.

The transparent sheet 40 is, for instance, made of plastic. Since the transparent sheet 40 covers the entire top of the tray 21, the optical cables 29 and 30 connected in the tray 21, and especially the optical cables 29 and 30 in densely packed areas of the tray 21, are prevented from jumping out.

Moreover, a writable label 97 can be stuck to the upper surface of the transparent sheet 40. For instance, using the label 97 to display the connection targets for the optical cables 29 and 30 allows clarification of the optical cable 29 and 30 connection operations, which are complicated by the high-density installation of optical adaptors 31 and optical cables 29 and 30 in the tray 21. Specifically, a transparent or semi-transparent material is used for the label 97. This allows the connection state of the optical cables 29 and 30 to be understood even when the transparent sheet 40 is covering the top of the tray 21.

In the present embodiment, the transparent sheet 40 covering the entire upper part of the tray 21 can be rotated approximately 270 degrees in the direction shown by the arrow in FIG. 12. FIG. 2 shows a state in which the transparent sheet has been rotated approximately 270 degrees from the state shown in FIG. 12. The following describes the rotating construction of the transparent sheet 40 with reference to FIG. 13 and FIG. 14.

Figure 13:
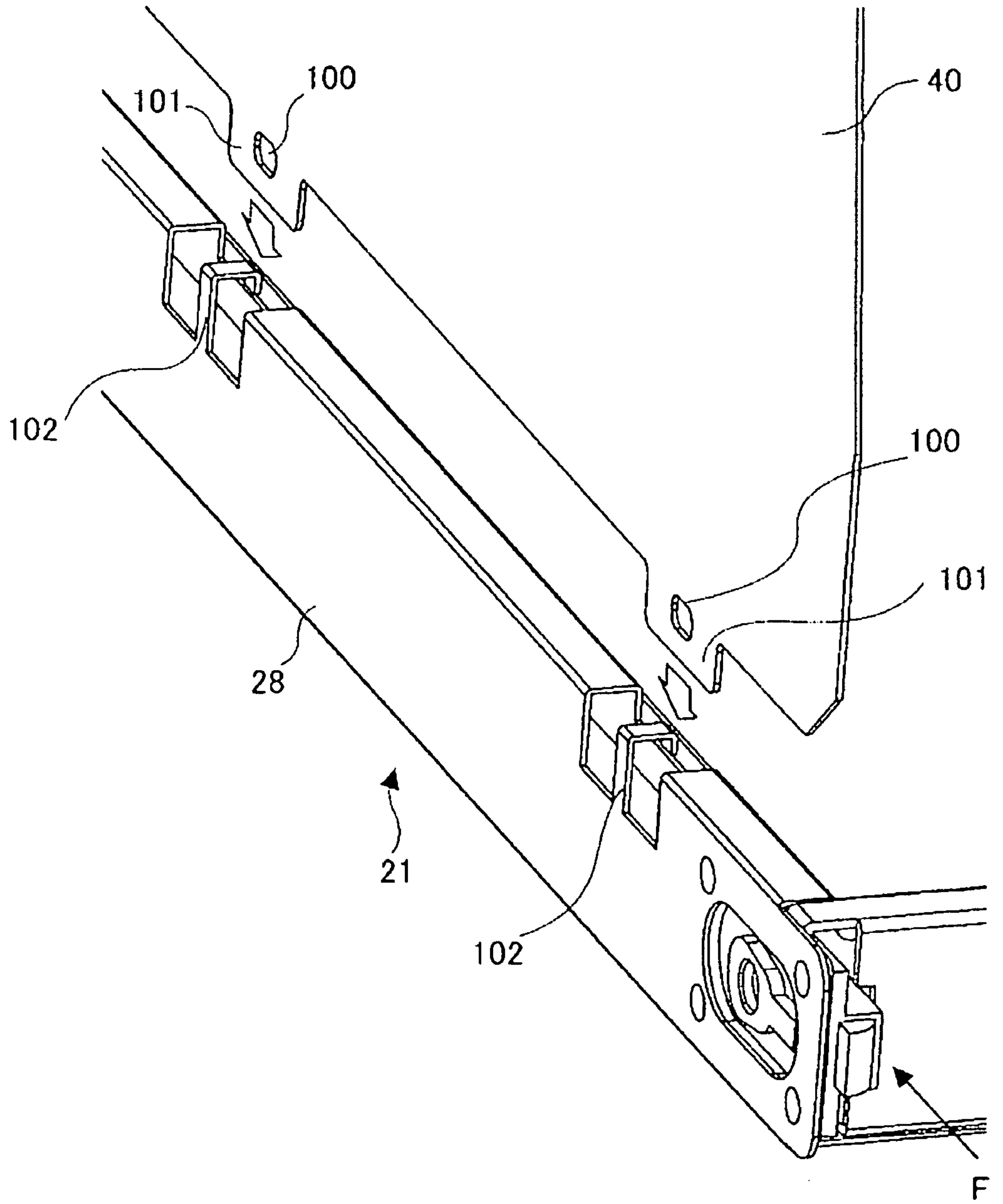
FIG. 13 is a partial enlarged perspective view to illustrate a rotating construction of the transparent sheet.

FIG. 13 is a partially enlarged perspective view of the tray 21 to illustrate the rotating construction of the transparent sheet 40.

As shown in FIG. 13, protruding parts 101, with transparent sheet rotation holes 100 formed therein, extend from a peripheral section of a transparent sheet 40 side corresponding to the side surface 28 of the tray 21.

Moreover, cut-out sections are formed in an upper part of the side surface 28, which is located on the near side (X1 side in FIG. 2) when the tray 21 is in the tray holder body 22. Transparent sheet rotation support members 102, which have a substantially open-sided square profile when seen in a direction indicated by an arrow F, are provided in the cut-out sections.

The protruding parts 101 of the transparent sheet 40 are slid into the cut-out sections of the side surface 28 of the tray 21, and the transparent sheet 40 and tray 21 are connected by inserting the transparent sheet rotation support members 102 of the tray 21 into the transparent sheet rotation holes 100 formed in the protruding parts 101 of the transparent sheet 40.

Figure 14:
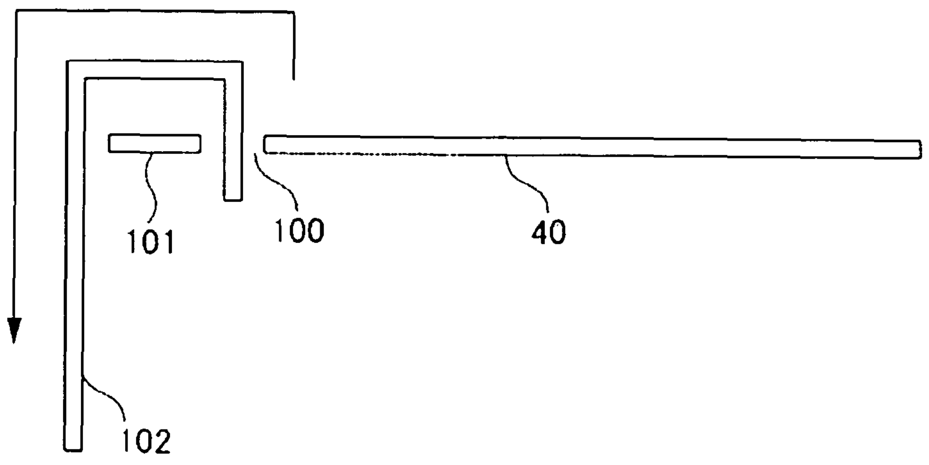
FIG. 14 is diagram to illustrate a connection between rotation holes in the transparent sheet and a transparent sheet rotation supporting member of the tray, and to show a rotation direction for the transparent sheet.

FIG. 14 is a diagram to illustrate a rotation direction for the transparent sheet 40 and a connection between the transparent sheet rotation holes 100 formed in the protruding part 101 of the transparent sheet 40 and the transparent sheet rotation support members 102 of the tray 21. FIG. 14 shows the transparent sheet rotation support members 102 and the transparent sheet 40 when seen in the direction of the arrow F in FIG. 13.

As shown in FIG. 14, the transparent sheet rotation support members 102 of the tray 21 are connected to the transparent sheet 40 via the transparent sheet rotation holes 100 formed in the protruding parts 101 of the transparent sheet 40. The transparent sheet 40 can then be rotated approximately 270 degrees by having the transparent sheet rotation support members 102 with the substantially open-sided square profile slide in the transparent sheet rotation holes 100 in the direction indicated by the arrow.

With this construction, the transparent sheet 40 is rotatable and the tray can be made thin without providing a special part such as a pivot hinge or the like. Moreover, since the top of the tray 21 can be opened by rotating transparent sheet 270 degrees, i.e. to position perpendicular to an upper surface of the tray 21, operations inside the tray 21, such as connection of the optical adaptors 31 and the optical cables 29 and 30, can be performed with ease.

The above has described an embodiment of the present invention, but the present invention is not limited to a particular embodiment and various modifications and changes are possible within the scope of the invention recorded in the patent claims.

For instance, in the above embodiment, an example was described in which the wiring connection apparatus was a patch panel for connecting optical cable, but the present invention is not limited to this example, and the wiring connection apparatus can be used to connect wiring of one side to wiring of another side in electronic apparatus such as communications apparatus, information processing apparatus, and measurement apparatus.

Additionally, the present invention is therefore capable of providing a wiring connection apparatus, which allows high-density installation (i.e. installation of a large number) of the optical adaptors for connecting optical cable, is small in size (i.e. has a thin construction), and is easily expanded, and realizes favorable optical cable routing and ease of use. Further, the present invention is capable of providing a wiring connector apparatus, which allows the optical cables to be routed safely without risk of optical cable damage.

What is claimed is:

1. A wiring connection apparatus comprising:

a tray including a plurality of wiring connection members connecting a plurality of wiring;

a tray holder body, which holds the tray, wherein the tray is rotatably provided in the tray holder body;

a wiring introduction opening, formed in the tray to thereby move with the tray, introducing the plurality of wiring into the tray, the wiring introduction opening being formed in proximity to an axis of rotation of the tray;

a plurality of wiring connection member fitting members, wherein the wiring connection member fitting members each have a plurality of the wiring connection members fitted therein, and are provided to form rows in the tray; and a plurality of wiring arrangement slits passing the wiring, the plurality of wiring arrangement slits respectively being between adjacent sets of wiring connection members in a first row and being arranged in a second row, wherein each wiring connection member fitting member comprises two bent members, which extend in a width direction of the tray, and has line-symmetry about a plane where the two bent members are in contact, in the wiring connection member fitting member, top plate parts and bottom plate parts are respectively provided above and below a surface where the wiring connection members are fitted, and the wiring connection member fitting member has a substantially open-sided square profile in cross section.

2. The wiring connection apparatus according to claim 1, wherein the top plate of each of the two bent members provided to be in contact with each other is formed in the same plane, and a surface formed in the plane accepts affixing of a writable label.

3. A wiring connection apparatus comprising:

a tray including a plurality of wiring connection members connecting a plurality of wiring;

a tray holder body, which holds the tray, wherein the tray is rotatably provided in the tray holder body;

a wiring introduction opening, introducing the plurality of wiring into the tray, the wiring introduction opening being formed in proximity to an axis of rotation of the tray;

a plurality of wiring connection member fitting members, wherein the wiring connection member fitting members each have a plurality of the wiring connection members fitted therein, and are provided to form rows in the tray;

a plurality of wiring arrangement slits passing the wiring, the plurality of wiring arrangement slits respectively being between adjacent sets of wiring connection members in a first row and being arranged in a second row; and a wiring connection member insertion and removal member to insert and remove the wiring connection member to and from the wiring connection member fitting member, the wiring connection member insertion and removal member being provided in the tray, and the wiring connection member insertion and removal member has a holding part that corresponds in shape to an external form of the wiring connection member.

4. A wiring connection apparatus comprising:

a tray including a plurality of wiring connection members connecting a plurality of wiring;

a tray holder body, which holds the tray, wherein the tray is rotatably provided in the tray holder body;

a wiring introduction opening, introducing the plurality of wiring into the tray, the wiring introduction opening being formed in proximity to an axis of rotation of the tray; and a plate-form tray rotation stopper rotatably provided on a tray side surface, which is exposed by rotating the tray, the tray rotation stopper including:

a pivot;

a screw part provided a predetermined distance away from the pivot;

a main part pierced by a tray rotation stopper slit in an arc centered on the pivot and with a radius corresponding to the predetermined distance between the pivot and the screwpart; and a top panel contacting part formed to extend from the main part, wherein the screw part locates in the tray rotation stopper slit, and the rotating tray rotation stopper causes the top panel contacting part to contact with a top panel of the tray holder body.

* * * * *

UNITED STATES PATENT AND TRADEMARK OFFICE

CERTIFICATE OF CORRECTION

PATENT NO. : 8,522,424 B2
APPLICATION NO. : 12/003937
DATED : September 3, 2013
INVENTOR(S) : Yoshinori Hoshino et al.

It is certified that error appears in the above-identified patent and that said Letters Patent is hereby corrected as shown below:

In the Claims

In Column 14, Line 20, In Claim 4, delete "screwpart;" and insert -- screw part; --, therefor.

Signed and Sealed this
Twenty-fourth Day of December, 2013

Margaret A. Focarino

Margaret A. Focarino
*Commissioner for Patents of the United States Patent and Trademark Office*